Nov. 26, 1940. R. D. ELLIOTT 2,222,608
ELECTRICAL SURVEYING IN DRILL HOLES
Filed May 17, 1937 3 Sheets-Sheet 1

Inventor
Raymond D. Elliott
By Lyon & Lyon
Attorneys

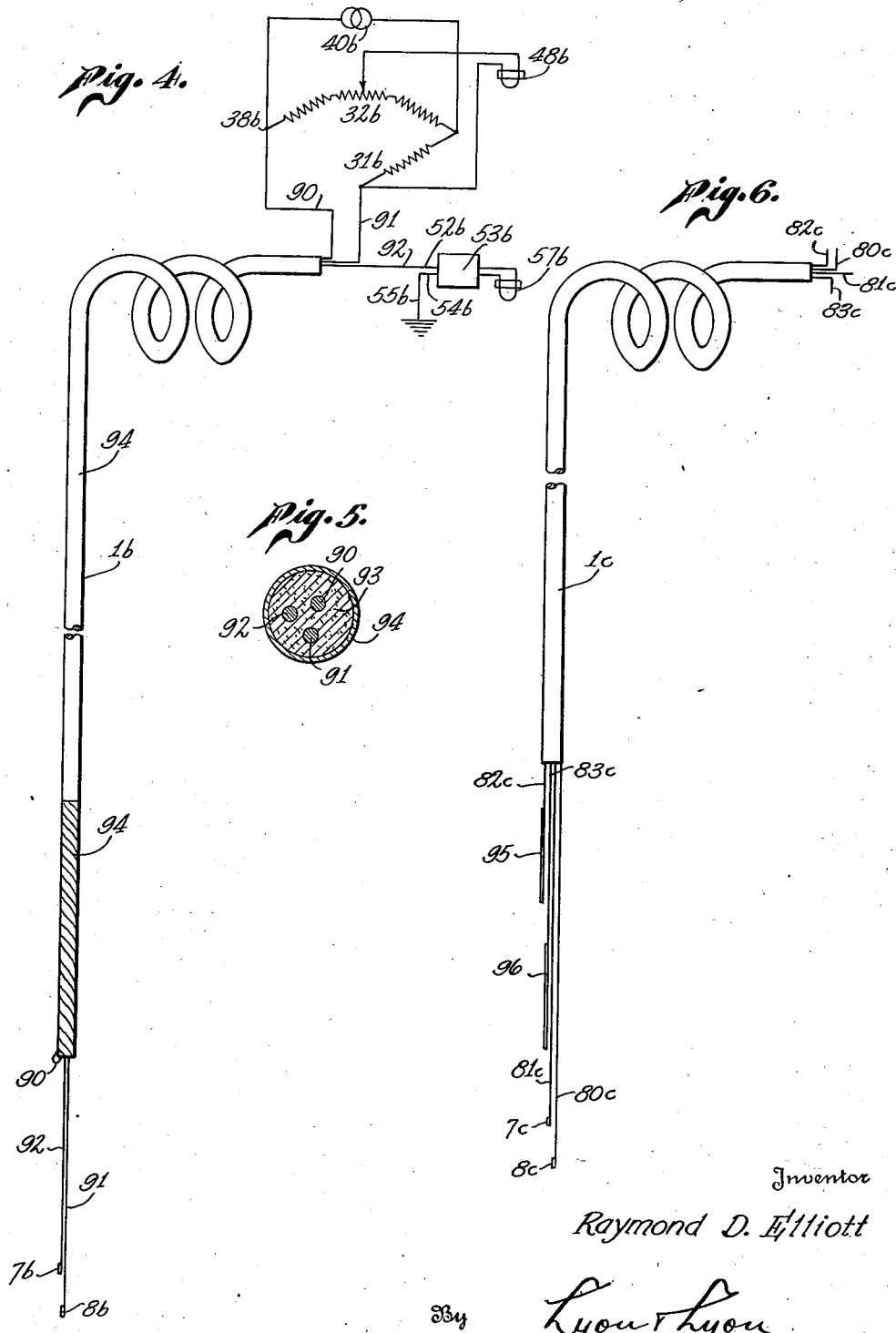

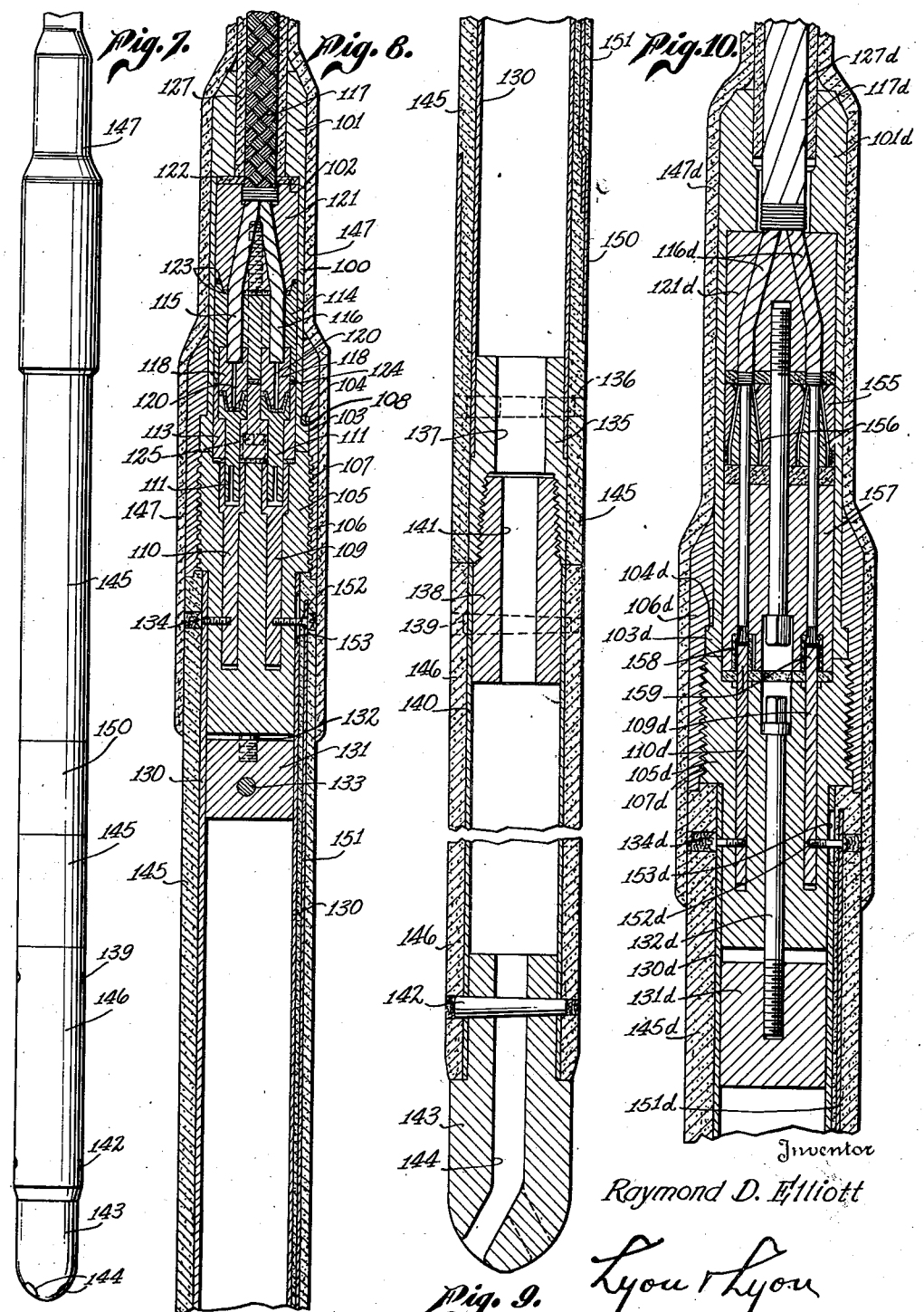

Patented Nov. 26, 1940

2,222,608

UNITED STATES PATENT OFFICE 2,222,608

ELECTRICAL SURVEYING IN DRILL HOLES

Raymond D. Elliott, Long Beach, Calif., assignor, by mesne assignments, to Schlumberger Well Surveying Corporation, Houston, Tex., a corporation of Delaware Application May 17, 1937, Serial No. 143,092

29 Claims. (Cl. 175—182)

This invention relates to the art of earth exploration by electrical methods, and particularly to the exploration of formations penetrated by drill holes.

In Huber United States Patent No. 2,072,950 issued March 9, 1937, on Method of and apparatus for electrically exploring earth formations, a method of electrically exploring the formation surrounding a drill hole is described, which method consists, (1) in traversing the drill hole with a pair of vertically spaced electrodes on the end of a cable, each electrode being connected to the surface by an independent insulated conductor in the cable; (2), applying potential from an external source between ground and one of said cable conductors at the surface, and measuring and recording variations in resistance of the circuit as the electrodes are moved through the hole on the cable; and (3), measuring and recording the variations in potential between ground and the other cable conductor at the surface as the electrodes are moved through the hole, these variations in potential resulting largely, if not substantially entirely, from the electric field created in the formation adjacent the other electrode by the potential impressed on the first mentioned electrode.

The two sets of measurements are recorded in the form of two graphs which have been found very useful in logging oil wells. The graph produced by operation No. 2 indicates the resistance change in the formation immediately adjacent the drill hole and the graph produced by operation No. 3 indicates resistance changes in the formation at a distance from the hole approximately equal to the spacing between the electrodes.

The Huber patent discloses a system employing direct current, which has been found satisfactory under most conditions. However, it has long been known that for earth explorations under some conditions alternating current is superior to direct current. Thus with alternating current polarization errors are minimized, and, furthermore, the effects of extraneous earth currents (which are usually unidirectional), can be largely eliminated by employing indicating equipment incapable of responding to the extraneous earth currents but adapted to respond to alternating currents of the particular frequency employed.

The apparatus and methods disclosed in the Huber patent can be employed wtih alternating current as well as with direct current by substituting an alternating current source for the direct current source and using indicating instruments responsive to alternating current. However, when alternating current is employed with the apparatus of the Huber patent, a gradual drift of the recorded graphs may occur due to the fact that the impedance characteristics of the cable conductors connecting the electrodes in the hole and the surface equipment may change as the cable is wound on to and unwound from the winch which controls it. This gradual drift of the curves does not reduce their value in indicating the nature of the formation traversed, but is undesirable in that the curves may drift beyond the recording limits of the record apparatus and the record strips employed.

A broad object of the present invention is to eliminate the drift referred to when practicing the methods of the Huber patent with alternating current.

Another object is to increase the sensitivity of the apparatus of the Huber patent when employed with alternating current.

Additional more specific objects, together with various features of the invention, will become apparent from the detailed description of the invention which follows.

In the drawings:

Fig. 4 is a schematic diagram, illustrating still another modification of the system, shown in Fig. 1, employing a cable having three separately insulated conductors and an external metallic shield over a portion of the lower end of the cable.

Fig. 5 is a cross section indicating a possible cable construction that may be employed in the system shown in Fig. 4.

Fig. 6 is a schematic diagram indicating a modification of the system shown in Fig. 2.

Fig. 7 is an elevation view of a complete electrode structure that may be employed in the system shown in Fig. 1.

Figs. 8 and 9 are enlarged vertical sectional views of the electrode structure shown in Fig. 7.

Fig. 10 is a detail vertical sectional view showing an electrode structure similar to that disclosed in Figs. 7 to 9, but modified for use with a cable of the type disclosed in Figs. 2 and 3.

Figure 1:
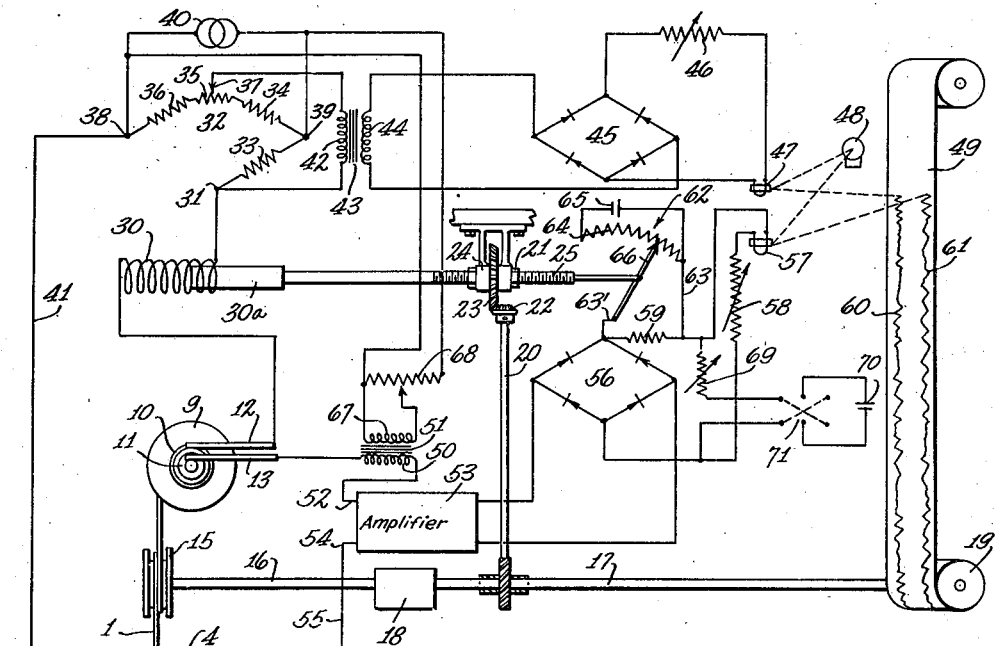
Fig. 1 is a schematic diagram of a system for drill hole exploration when employing a two conductor cable.

Referring first to the schematic diagram of Fig. 1, the apparatus there represented comprises a cable 1 adapted to be raised and lowered in a drill hole 2 penetrating a formation 3 in which an electrical survey is to be made. The bore hole may have a short length of casing 4 at the surface end but where the electrical characteristics of the formation surrounding a drill hole are to be determined the major portion of the hole should be uncased.

The cable 1 may contain a pair of insulated conductors 5 and 6 connected at their lower ends to vertical spaced apart electrodes 7 and 8, respectively. The upper end of the cable is wound on a winch 9 which is used to raise and lower the cable in the drill hole and the upper ends of the conductors 5 and 6 may be permanently connected to slip rings 10 and 11 on the winch which make sliding contact with brushes 12 and 13, respectively, these brushes functioning to complete connection between the upper ends of the cable conductors and the electrical apparatus at the surface. The cable 1 is wrapped around a pulley 15 so that the pulley rotates in proportion to the vertical movement of the cable. Pulley 15 rotates the shaft 16 which drives a shaft 17 at reduced speed through a speed reducing mechanism 18 of any desired type. The shaft 17 functions to rotate a reel 19 for winding up a photographic film on which electrical measurements are recorded by recording apparatus to be described. The shaft 17 is coupled to a shaft 20 which drives a rotatably mounted nut 21 through bevel gears 22 and 23. The nut 21 may be suitably supported for rotation in bearings 24. Rotation of the nut 21 functions to shift a shaft 25 longitudinally for a purpose to be described later. The brush 12, connected through the cable conductor 6 with the electrode 8, is connected through a reactance element 30 to one diagonal point 31 of a Wheatstone bridge 32 comprising four impedance elements 33, 34, 35 and 36, respectively, the impedance element 35 having a variable tap 37 thereon which constitutes the diagonal of the bridge opposite the diagonal 31. One of the other diagonal points 38 and its opposite diagonal point 39 are connected to a source of alternating current 40 which is employed to energize the bridge. The diagonal point 38 is also connected to ground by a ground conductor 41. This ground connector may, if desired, be made to any suitable structure, such as the well casing 4. In operation the impedance elements 33, 34 and 36 constitute the known or fixed resistance arms of the bridge and the circuit including the ground conductor 41, the formation 3, the electrode 8, cable conductor 6, the slip ring 10, brush 12, and the reactance element 30 in series constitute the unknown arm of the bridge. Adjustments of the bridge to a desired condition of balance or unbalance may be had by moving the tap 37, and/or, if desired, one or more of the impedance elements 33, 34, 36 may be made variable. The diagonal points 31 and 37 constitute the output diagonals of the bridge and they are connected directly to the primary winding 42 of a transformer 43. If the bridge is adjusted to approximate balance then any slight variations in the impedance of the circuit including the electrode 8 and the formation 3 produces a substantial percentage variation in potential across the output diagonal points 31 and 37, which potential is applied to the primary winding 42 of transformer 43. The transformer 43 is also provided with a secondary winding 44 which is connected through a bridge type rectifier 45 and a variable resistance 46 to a galvanometer element 47 which is positioned to reflect light from a lamp 48 onto the photographic film 49.

The current applied between the ground connection (at the ground conductor 41) and the electrode 8 produces an electric field in the formation and variations in this field produce varying potentials in the other electrode 7. These potential variations are applied through the cable conductor 5, the slip ring 11 to the brush 13, and thence through the secondary winding 50 of a transformer 51 to one input terminal 52 of an amplifier 53. The other input terminal 54 of the amplifier is connected to ground through a conductor 55. The varying potentials produced in electrode 7, together with additional potentials that may be added thereto by means of the transformer 51, are amplified in the amplifier 53 and applied to the input terminals of the bridge type rectifier 56. The output terminals of this rectifier 56 are connected to a second mirror galvanometer element 57 through a variable resistance 58 and a resistor 59 in series.

Except for the introduction of the reactance element 30, the A. C. source 40, the transformer 43, rectifier 45, the transformer 51, the amplifier 53, the rectifier 56 and the resistor 59, the structure so far described with reference to Fig. 1 is similar to the circuit disclosed in the Huber patent referred to, and would function in the same general manner if a D. C. source were substituted for the A. C. current source 40. Thus as the cable 1 is lowered or raised to move the electrodes 7 and 3 through the hole the changes in resistance of the formation closely adjacent the electrode 8 in the primary circuit would apply varying potentials to the mirror galvanometer 47, causing the latter to trace a curve 60 on the moving film 49 and the variations in the electric field adjacent the electrode 7 would cause the mirror galvanometer to trace a second curve 61 on the moving film 49.

When employing direct current, the movements of the galvanometers 47 and 57 are substantially pure functions of the varying electrical characteristics of the formation traversed by the electrodes because the direct current resistance of the cable 1 remains constant irrespective of the amount of cable wound upon the winch 9. However, if the usual type of cable is employed in a system energized with alternating current, the curves 60 and 61 are no longer pure functions of the electrical characteristics of the formations traversed by the electrodes because the electrical characteristics of the conductors in an ordinary cable change with changes in the configuration of the cable. Thus a given length of two conductor cable in which the two conductors are merely separated from each other by insulating material will ordinarily have very perceptibly different impedance and coupling when the cable is stretched out straight than when a substantial portion of it is wound in a coil on a winch. In general, as such a cable is wound in a coil on a winch both the separate impedance of the two conductors increase (due chiefly to an increase in inductance) and the coupling between the conductors increases due to the increase in the common magnetic fields of the conductors.

In a system of the type disclosed in the Huber patent, when alternating current is used instead of direct current the general effect of the changing impedance and coupling characteristics of the cable as the latter is wound and unwound from the winch is to cause the curve or curves on the film to gradually shift their mean positions so that with a film strip of standard width the curves would run off the edge of the strip during a run in a well of any appreciable depth.

In accordance with the circuit of Fig. 1, the gradual drift of the curves 60 and 61, due to the varying impedance of the cable 1, is prevented by introducing compensating impedance changes in other portions of the circuit.

To compensate for the varying impedance of the input conductor 6, the inductance element 30 is connected in series therewith and the inductance of this element is varied in proportion to the winding and unwinding of the cable on the winch by providing the inductance coil 30 with a movable magnetic core 30a adapted to be moved inwardly and outwardly of the coil 30 by the screw 25 which, as previously mentioned, is gradually moved longitudinally in response to rotation of the nut 21 coupled by the gears 22 and 23 to the shaft 20 and the shaft 17. By properly proportioning the dimensions of the coil 30 and the movement of the core 30a relative to the movement of the cable, the impedance of the coil 30 can be made to vary in inverse ratio to the variations in the impedance of the conductor 6 due to the winding and unwinding of the cable 1 on the winch 9, thereby maintaining the impedance of the circuit between the electrode 8 and the bridge point 31 constant at all times. This eliminates any tendency to drift of the curve 60 due to variations in the impedance of the cable.

As previously indicated the potential applied to the galvanometer 57 should be a function only of the potentials on the electrode 7 resulting from the electric field produced by the current flowing from electrode 8. However, when the system is energized with alternating current and a cable of conventional type is employed potential will also be induced in the cable conductor 5 directly from the cable conductor 6, which potential will be superimposed on the potential picked up by the electrode 7. If this induced potential were constant, it would not interfere, but, unfortunately, it varies due to the varying coupling characteristics between the two conductors of the cable as the latter is wound and unwound.

To prevent a drift of the curve 61 recorded by the galvanometer 57 in response to variations in the cable characteristics, I provide a potentiometer 62 having output leads 63 and 63′ connected across the resistance 59 to impress an auxiliary potential on the galvanometer 57. The potentiometer 62 may comprise a slide resistor 64 connected across a battery 65 with one end of resistance 64 connected to the conductor 63 and a variable sliding contact 66 connected to the conductor 63′. This movable contact 66 is mechanically connected to the screw 25 so that it varies the potential impressed across resistance 59 in response to movement of the cable. By suitably dimensioning and proportioning the potentiometer 62 a voltage may be impressed across the resistor 59 which will exactly compensate for the variations in potential due to the varying characteristics of the cable 1.

The transformer 43, coupling the output of bridge 32 to the rectifier 45 functions as a filtering element to prevent extraneous direct current potentials that may be present in the formation and be picked up by the electrode 8 from reaching the galvanometer 47 while permitting the transmission of the alternating current of the frequency of the source 40.

The resistor 46, connected in series with the galvanometer 47 constitutes a sensitivity control whereby the maximum throw of the galvanometer may be brought within desired limits.

By using the rectifiers 45 and 56, respectively, it is possible to use direct current galvanometers 47 and 57, respectively, which in general have more desirable characteristics than do alternating current instruments. However, it is to be understood that if desired alternating current instruments may be substituted for the rectifiers and direct current galvanometers shown in Fig. 1.

The potentials in the output circuit of the bridge 32 have substantial magnitude sufficient to properly actuate the galvanometer 47. However the potentials picked up by the electrode 7 are some times relatively feeble so that even after being amplified in the amplifier 53 they are too weak to pass the rectifier 56 and properly energize the galvanometer 57. In this connection it should be noted that many rectifiers that are otherwise well fitted for use in my system have relatively low sensitivity at potentials below a particular magnitude. In other words, they pass substantially no current until the voltage applied thereto is increased above a particular threshold value but after that threshold value has been reached they are very efficient. In some instances the potentials picked up by electrode 7, even after amplification in the amplifier 53, may not be above the threshold value of the rectifier. I therefore provide the transformer 51 as a booster to raise the level of the potentials picked up by electrode 7. To this end the transformer 51 is provided with a primary winding 67 connected through an adjusting potentiometer 68 to the alternating current source 40. The potential applied by the booster transformer 51 to the amplifier input is constant and in the absence of any potential from the electrode 7 merely biases the galvanometer 57 to a fixed position relative to the film 49. However, it raises the value of all the potentials applied to the rectifier 56 above the threshold value of the latter so that the varying impulses picked up by the electrode 7 are made effective on the galvanometer 57.

It might be supposed that by suitably adjusting the amplification of the amplifier 53 the booster transformer 51 could be dispensed with. There is a distinction, however, between the effects of the amplifier and the booster transformer. The amplifier increases the potentials picked up by electrode 7 geometrically; that is, all the potentials picked up by the electrode are multiplied by a constant which is the amplification constant of the amplifier. This causes the galvanometer 57 to move through a wide range in response to slight variations in the average potential picked up by electrode 7 and may cause the beam to swing clear off the film strip. Some compensation for such excessive swinging may be made by varying the variable resistor 58 in series with the galvanometer, but I find it desirable in many instances to be able to increase the average level of the impulses picked up by electrode 7 without increasing the magnitude of swings between maximum and minimum signal strength and such increase in average load without any increase in the magnitude of the swings is obtained by the booster transformer 51.

It is to be understood that amplifier 53 is not always necessary and in some cases may be eliminated, under which conditions the use of the booster transformer 51 may be absolutely necessary to increase the magnitude of the impulses above the threshold value of the rectifier 56.

It might be supposed that the need of the booster transformer, or an amplifier, exists only because of the threshold characteristic of the rectifier 56 and that if the rectifier were eliminated and the impulses applied directly to an alternating current galvanometer there would be no occasion for raising the level of the impulses. However it should be noted that in most alternating current meters the throw of the movable element is a function of the square of the electrical impulses applied thereto and that for impulses below definite magnitudes the instruments are very insensitive. Hence it may be said that mean alternating current instruments have a threshold characteristic and the need for a booster transformer and/or an amplifier may still exist when such instruments are employed.

As illustrated in Fig. 1, no direct current filtering element, corresponding to the tansformer 43, has been shown in the secondary circuit. However it is desirable to have such a device ahead of the rectifier 56 and if the amplifier 53 is of conventional construction it will incorporate either transformer or capacity coupling elements which would effectively pass only alternating current.

In addition to the adjusting elements previously described, I have shown in Fig. 1 a variable resistance 69 and battery 70 adapted to be connected in series across the output of the rectifier 56. The battery 70 is adapted to be connected into the circuit by a reversing switch 71 whereby its polarity may be reversed. The battery 70 produces a biasing effect on the galvanometer 57, which effect may be reversed by throwing the switch 71 and may be varied by adjusting the operable resistor 69. This feature has been found convenient in practice for adjusting the mean position of the curve 61 to a desired point on the film at the beginning of a run.

It is to be understood that during an actual run on a well no adjustments are made in the circuit except those automatically produced by the potentiometer 62 and the variable reactance 30 actuated in response to the movement of the cable.

With a cable of the type previously mentioned, namely, one containing two conductors, insulated from each other but not shielded from each other, it is quite essential that some compensating devices, such as those discussed with reference to Fig. 1, be employed because of the relatively great magnitude of the changes in the impedance characteristics of the cable as it is wound and unwound from the winch. However I have discovered that by employing special cable structures and electrode arrangements, the variations in the electrical characteristics of the circuit due to winding and unwinding of the cable, may be greatly reduced and in some instances reduced sufficiently to avoid the necessity of mechanical compensation as provided for in Fig. 1. Even where such special cable structures and electrode arrangements do not entirely eliminate the necessity for automatic adjustment, they make it easier to obtain what automatic adjustment is necessary. Some of the special cable and electrode arrangements that may be employed will now be described with reference to Figs. 2, 3, 4, 5 and 6:

In these figures, elements corresponding to elements in Fig. 1 bear the same reference numerals distinguished by different letter suffixes. Furthermore, to simplify the diagrams, most of the circuit details of Fig. 1 have been eliminated in Figs. 2 and 4; and all of them have been eliminated in Fig. 6. It is to be understood that the complete circuit shown in Fig. 1 may be employed with the arrangements shown in Figs. 2, 4 and 6, but that the impedance variations in the cables in Figs. 2, 4 and 6, due to winding and unwinding of the cables, will in general be much less than with the simple cable shown in Fig. 1, and therefore the problem of compensating for the changes in the cables will be greatly simplified. Under many conditions of operation the necessity of the variable compensating reactance 30 and potentiometer 62 of Fig. 1 may be entirely eliminated when using the cable structures and connection shown in Figs. 2, 4 and 6.

Figure 2:
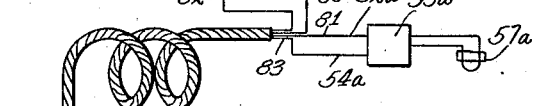
Fig. 2 is a schematic diagram indicating a variation of the system shown in Fig. 1, employing a cable containing four separately insulated and shielded conductors.
Figure 3:
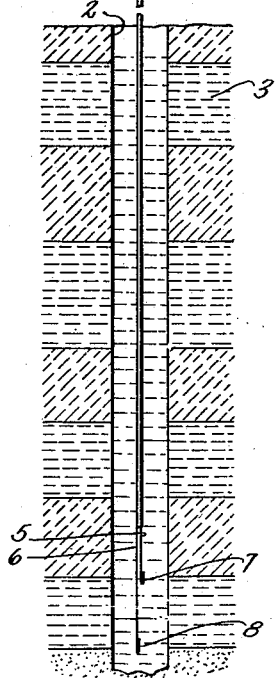
Fig. 3 is a detailed cross sectional view, illustrating the construction of a cable that may be employed in the system shown in Fig. 2.

Referring first to Figs. 2 and 3, the cable 1a therein disclosed differs from the cable 1 in Fig. 1 in that instead of comprising merely a pair of insulated conductors surrounded by insulating material, it comprises four separate conductors 80, 81, 82 and 83, each individually enclosed in a mass of flexible insulating material 84, and a layer of armor wires 85 surrounding each insulated conductor and substantially individually enclosing each conductor and shielding it from the other conductors. The four complete insulated and shielded conductors are wound together into a cable and to improve the mechanical characteristics of the cable the four armored conductors may be wound about a central core 86 of rope.

Referring now particularly to Fig. 2, two of the insulated cable conductors, say conductors 80 and 81, correspond to conductors 6 and 5, respectively, of the cable in Fig. 1 and are connected at their lower ends to electrodes 8a and 7a, respectively, and at their upper ends to the diagonal 31a of the bridge 32a and to the input terminal 52a of amplifier 53a respectively. The circuit of Fig. 2 differs essentially from that of Fig. 1 in that the diagonal point 38a of bridge 32a, instead of being connected to ground at the surface, is connected to the upper end of one of the other cable conductors 82 and the conductor 54a of amplifier 53a instead of being connected to ground at the surface is connected to the upper end of the other cable conductor 83. The lower ends of these cable conductors 82 and 83 are connected to the armor 85 of the cable which being in contact with the fluid in a drill hole, functions as a common ground return element for the system.

By virtue of the fact that the currents flowing in conductors 80 and 82 are always substantially equal and opposite in direction, the currents in the two conductors tend to induce equal and opposite currents in the conductors 81 and 83 so that whether the cable is coiled on the winch or extended in the hole there is little coupling between the primary and secondary circuits of the system within the cable. Furthermore, the fact that equal and opposite currents flow in conductors 80 and 82 and in conductors 81 and 83, the primary and secondary circuits considered independently of each other, have relatively low self-inductance (constituting in effect non-inductive windings), thereby further reducing any total change in inductance and impedance that may occur due to winding and unwinding of the cable.

Furthermore, the armor wires 85 substantially completely and individually enclosing each conductor, act as effective shielding means between the conductors to further reduce both coupling between the conductors and reduce the variations in the inductance that may occur in each individual conductor because of coiling and uncoiling of the cable on the winch.

The circuit and cable construction shown in Figs. 2 and 3 has proven very successful in practice and in many cases eliminates any necessity of compensating at the surfaces for changes in electrical characteristics due to winding and unwinding of the cable. It is to be understood, however, that although for best results it is desirable to use both the ground return circuit in the cable (thereby necessitating the 4-conductor cable) and the individual shielding about the conductors, that some improvement may be obtained by using either feature alone. Thus the operation of the circuit of Fig. 1 may be improved by individually shielding the two conductors 5 and 6 of the cable therein disclosed, without changing the separate ground return circuits. Likewise the operation may be improved by employing a 4-conductor cable, two conductors of which constitute a ground return and connect to a ground electrode or electrodes spaced from the electrodes 7 and 8, the four conductors not being individually shielded from each other. Some advantage may also be obtained by employing a cable having three insulated but unshielded conductors as shown in Fig. 4. In Fig. 4 the cable simply consists of three electrical conducting elements 90, 91 and 92 (Fig. 5) imbedded in a mass of insulating material 93, such as rubber, and enclosed over a portion of its length adjacent the lower end in a metallic armor 94 which may consist of a basket weave metal fabric or of a layer of metal wires. This armor 94 functions as a ground electrode in the hole and preferably is of a substantial length extending upwardly from a point adjacent the lower end of the cable but may or may not extend over the entire length of the cable. In the circuit of Fig. 4 the armor 94 is connected to the lower end of one of the conductors 90 and the upper end of this conductor 90 is connected to the diagonal point 38b of the bridge 32b. The other conductors 91 and 92 correspond to the conductors 5 and 6 in Fig. 1, conductor 91 being connected at its upper end to diagonal 31b of the bridge and at its lower end to the electrode 8b and the conductor 92 being connected at its upper end to the input terminal 52b of amplifier 53b and being connected at its lower end to the electrode 7b. The other input terminal 54b of the amplifier is grounded at the surface through a conductor 55b, the same as in Fig. 1.

It will be observed that the arrangement shown in Figs. 4 and 5 is similar electrically to the arrangement shown in Fig. 2 and Fig. 3, except that only a 3-conductor cable is employed, the cable conductors are not individually shielded from each other, and the amplifier input terminal 54b is grounded at the surface instead of through a fourth conductor in the cable to a ground element at the lower end of the cable.

The arrangement of Fig. 4 and Fig. 5 has the advantages discussed in connection with Figs. 2 and 3 that the currents in the conductors 90 and 91, being equal and flowing in opposite directions at any instant, thereby greatly reduce the inductance of the circuit comprising these two conductors and also reduce the coupling effect between this circuit and the conductor 92. The advantage of this arrangement is that it necessitates only a 3-conductor cable and it possesses some, but not all, of the advantages of the preferred circuit shown in Fig. 2.

An alternative cable arrangement is shown in Fig. 6 for a cable comprising four conductors but having no metallic shielding which could be used as a ground element. In Fig. 6 the surface circuit would be identical with that shown in Fig. 2 and the four cable conductors are identified by reference numerals corresponding to those employed in Fig. 2 but with the suffix c. In fact the only difference in arrangement shown in Fig. 6 and that shown in Fig. 2, is that the cable 1 has no armor on it and the lower ends of the conductors 82c and 83c are connected to separate electrodes 95 and 96 which are in spaced relation with respect to the remaining electrodes 8c and 7c which are connected to the conductors 80c and 81c. The electrodes 95 and 96 may be spaced longitudinally from each other as shown in Fig. 6 or they may be coextensive longitudinally, or may even be combined into a single electrode. It is important, however, that the electrodes 95 and 96 be relatively long as compared to the vertical thickness of the strata in the formation that are to be detected and that the other electrodes 7c and 8c be relatively short as compared with the thickness of the strata to be explored. If the electrodes 7c and 8c—and these remarks apply to the electrodes 7 and 8 in all of the figures—were of vertical dimension comparable to the thickness of the strata to be detected there would be no short demarcation in the curves 60 and 61 (Fig. 1) as the electrodes passed from one strata to another. On the other hand, if the auxiliary electrodes 95 and/or 96 were also short relative to the thickness of the strata, then double readings would be obtained in response to each strata; one reading being obtained when, for instance, the electrode 8c passed a strata junction and a similar reading being obtained again when the cooperating electrode 95 passed the junction. Of course where the ground connection or connections are made at the surface, as shown in Fig. 1, or on the armor of the cable, as shown in Fig. 2, any possibility of double readings is eliminated; in Fig. 1 because of the fact that the ground electrodes do not move, and in Fig. 2 because of the fact that the armor extends substantially the full length of the hole from the electrodes up to the top.

In Fig. 4, due to the fact that the one side of the secondary circuit (the circuit associated with the galvanometer 57c) is grounded at the surface, the cable conductor 92 will have appreciable self-inductance, which self-inductance will vary with the winding and unwinding of the cable. However, a change in the inductance of the secondary circuit is not so important as a change of inductance in the primary circuit because the currents in the latter are relatively large whereas the current in the conductor 92 will at all times be extremely minute. Therefore the potential drop in conductor 92 will under all conditions be small and under many conditions will not be sufficient to necessitate compensation at the surface. It is to be understood, of course, that the electrode structure at the bottom of the cable shown in Fig. 6 may, if desired, be employed in the circuit of Fig. 2 instead of utilizing the armor of the cable as a common ground. Likewise in Fig. 4, instead of employing a length of armor 94 on the cable as a ground for the conductor 90, an auxiliary relatively long electrode, such as the electrode 95 of Fig. 6, may be employed.

In the circuits hereinbefore described the electrodes in the hole have merely been indicated schematically. Various specific forms of electrode structures may be employed but a preferred form of electrode structure that may be employed with the circuit of Fig. 1 is shown in Figs. 7, 8 and 9, and a preferred form of electrode structure (insofar as it differs from Figs. 7, 8 and 9) for use in the cable of Figs. 2 and 3, is shown in Fig. 10.

Referring first to Figs. 7, 8 and 9, the electrode structure therein disclosed comprises an upper tubular member of metal 100 having a thick wall portion 101 at its upper end defining an opening for receiving the lower end of a cable and also defining an inner annular shoulder 102, and having at its lower end an outwardly extending flange 103 defining an external shoulder 104. The lower face of the flange portion 103 abuts against a block 105 of relatively strong insulating material, such as Bakelite, and is maintained in engagement therewith by a metal ferrule 106 threadedly secured to the block 105 by threads 107, the ferrule 106 having a shoulder 108 bearing against the shoulder 104 on the member 100 and thereby securing it against the block 105.

The block 105 contains a pair of metal conducting elements 109 and 110 imbedded therein, which elements are open at their upper ends to define sockets for receiving and making electrical contact with a pair of plug elements 111 which are imbedded in a block 113 of insulating material positioned within the lower end of the tubular member 100. The upper end of each of the plug elements 111 is recessed to define a socket of frusto-conical shape. Positioned above the block of insulating material 113 is another block of insulating material 114 having openings extending downwardly from the upper end for receiving a pair of insulated conductors 115 and 116 of a 2-conductor cable 117 which projects into the tubular member 101, first mentioned. The passages through the block 114, for passing the insulated cable elements 115 and 116, are enlarged at their lower ends to receive metal wedge elements 118 which have plug ends of frusto-conical shape adapted to nest into the sockets in the upper ends of the plug members 111 and having relatively small holes extending centrally therethrough for receiving the metal conducting elements 120 of the insulated elements 115 and 116. A block 121 of relatively strong material (preferably metal) is positioned within the tubular member 101 above the block 114, this block 121 having a pair of diverging holes for passing the elements 115 and 116, the lower ends of these openings being in registration with the upper ends of the openings in block 114. The upper end of block 121 is pressed against a gasket 122 bearing against the shoulder 102 in the member 100. Gasket material 123 is also inserted between the blocks 114 and 121, and gasket material 124 is inserted between the blocks 114 and 113. All three blocks 121, 114 and 113 are secured tightly together by a pair of bolts 125 (only one of which is shown in Fig. 8), which bolts extend upwardly from countersunk openings in the lower face of the block 113 and are threaded into the block 121. Clamping of the blocks 113 and 114 together with the bolts 125 forces the lower plug ends of the members 118 tightly against the upper socket ends of the members 111 to tightly grip the spread wires of the cable conductors 120 therebetween. It is to be understood that the cable conductors 120 not only serve as electrical conducting elements but also as the tensile supporting elements in the particular cable disclosed, and it is therefore necessary to anchor the ends of these conductors for mechanical reasons as well as to effect electrical conduction.

The upper portion of the electrode structure so far described is assembled as follows:

First a length of rubber hose 127 is slipped over the lower end of the cable and the hose and cable are inserted downwardly through the opening in the tubular member 101 for a substantial distance therethrough and the lower end of the cable is prepared by speading the elements 115 and 116 and stripping away the ends of the insulating material on those elements to uncover the conducting elements 120. At this time the ferrule member 106 is mounted on the tubular member 100 but is slid upwardly therealong out of the way. The gasket 122 is next placed over the end of the cable and the ends of the members 115 and 116 passed through the openings in the block 121. Then the gasket 123 and the block 114 are slipped over the members so that the ends of the conductors 120 project through the openings in the members 118 and a distance therebeyond. These conductors are then spread to bend back along the frusto-conical surfaces of the plug members 118 and the block 113 is placed in position with the upper socket ends of the plug members 111 therein against the spread conductors on the plug members 118. Next the bolts 125 are inserted and screwed up tight, thereby compressing the blocks 121, 114 and 113 tightly together against the gaskets intervening between them and the compression between blocks 113 and 114 wedges the spread strands of conductors 120 tightly between the members 118 and the members 111 thereby providing mechanical anchorage between the cable elements 120 and the assembly of blocks, and also establishing electrical contact between the conductors and the plugs 111.

The cable 117 is then withdrawn upwardly through the tubular member 101 carrying the blocks 121, 114 and 113 up into the sleeve 100 after which the members 105 and 103 are slipped together with the plugs 111 engaging the socket ends of the conductor members 109 and 110 and the block 105 secured firmly against the lower end of the tubular member 103 by slipping the ferrule 106 down over the member 101 and screwing it tightly onto the member 105.

The lower portion of the electrode structure comprises a steel tube 130, the upper end of which slips over the lower portion of member 105 and is secured in place by means of a plug 131 which is connected to the member 105 by a stud 132, the plug 131 being attached to the sleeve 130 by a pin 133 extending therethrough. The sleeve 130 constitutes a part of one electrode connected to the connecting member 110. To this end the tube 130 is connected to the member by a screw 134.

Referring now to Fig. 9 the tube 130 extends downwardly below the block 105 for a substantial distance and at its lower end is attached to a connector member 135 by a pin 136. The connector member 135 has a central passage 137 extending therethrough and the pin 136 is preferably offset from the center so as not to obstruct the passage 137. The lower portion of the exterior surface of the connector member 135 is of slightly larger diameter than the upper end so that it is flush with the exterior surface of the tubing 130. The connector member 135 is internally threaded at its lower end to receive the upper threaded end of a connector block 138 which is secured by a pin 139 to a lower section of steel tubing 140. The block 138 also has a passage 141 therethrough. The steel tubing section 140 extends downwardly for a substantial distance and is connected at its lower end by a pin 142 to an end piece of metal 143. This end piece may be rounded on its lower end and is provided with passages 144 communicating with the interior of the tubing 140.

It is usually desirable to fill the space within the tubing sections 130 and 140 with some heavy material to impart weight to the structure. It has been found convenient to fill the upper tubing section 130 with lead balls small enough to pass through the passages 137, these balls being inserted after assembly of the connector member 138 to the lower end of the tubing 130 but before the lower section including the connecting member 138 is screwed into place. The lead balls may be of such diameter that they will pass through the passage 137 but will not pass through the passage 141. The space within the tubing section 140 may be filled with lead discs inserted prior to the attachment of the end piece 143. These discs preferably have central apertures therein to permit the flow of fluid through the interior of the device.

As previously stated, the tubing 130 and also the tubing 140 which is connected to tubing 130 by connectors 135 and 138 constitute a part of one electrode. The end piece 143 constitutes the remaining portion of this electrode. It has also been stated previously that it is desirable that the electrodes in an electrical surveying system of the type disclosed be of limited effective vertical length. To this end the end piece 143 is the only portion of the electrode structure so far described that is exposed on its exterior to the well fluid. The exposed portion of this end piece 143 is of relatively limited length. However, it should be observed that well fluid can penetrate through the passage 144 freely into the interior of the tubes 140 and 130, thereby contacting a large surface inside the electrode structure. However current can only reach or leave the electrode either from the outer surface of the end piece 143 or through the liquid in the passage 144 from the interior of the electrode. The structure described therefore provides a large contact area with well fluid and yet confines the current leaving the exterior of the electrode to a very small area measured vertically.

To prevent electrical contact between well fluid and the exterior of the tubing sections 130 and 140, each is surrounded with a layer of rubber. Thus the tubing section 130 is enclosed in a layer of rubber 145 which extends clear from the upper end of the tubing section to the lower end of the connector element 135 completely enclosing the latter. The lower tubing section 140 likewise is covered with a layer of rubber 146 the upper end of which abuts against the end of the lower end of the rubber layer 145 and seals therewith and the lower end extends to the lower end of tubing 140 and abuts against a shoulder on the end piece 143.

To further insulate the tubing 130, a rubber ferrule 147 extends down over the upper end of the rubber layer 145 and extends upwardly over the metal ferrule member 106, the tubular member 101, and up along the outside of the rubber hose 127 which encloses the cable for a distance thereabove.

The second electrode element which is also of limited vertical extent and is insulated from and spaced vertically from the exposed area of the electrode structure described, comprises a thin metal band 150 mounted in a groove or circumferential recess provided therefor in the outer surface of the rubber layer 145. The outer surface of the band 150 is preferably in-set or countersunk with respect to the outer surface of the rubber 146 so that the possibility of the band directly contacting the side wall of the hole is diminished. The band 150 is connected to the conductor member 109 by a thin metal strip 151 which is connected at its lower end to the band 150 and extends upwardly therefrom through the rubber wall 145 to a point adjacent the upper end thereof, where it is connected by a screw 152 to the conductor member 109. The tubing 130 is provided with a recess 153 to permit passage through the tubing of the screw 152 without electrical contact therebetween. The strip 151 is completely imbedded in the rubber wall 145 and thereby insulated from both the tube 130 and from well fluid exterior of the rubber. As shown in the drawings, holes are provided in the rubber wall 145 opposite the screws 134 and 152, and pins 136, 139 and 142. After the screws and pins have been inserted these holes are filled with some waterproof plastic material to make the outer surface water-tight.

The electrode structure described with reference to Figs. 7, 8 and 9, involves only two electrodes. It will be obvious, however, that any desired number of bands similar to band 150 may be positioned at longitudinally spaced points along the structure and each connected to a thin metal strip imbedded in the rubber extending thereabove for completing connection to a cable conductor. Instead of bands, segments may be used, which extend only part way around the structure. It will be observed that the joint members 135 and 138 effect electrical connection to the lower electrode element 143 so that it is a simple operation to change the lower end section. This is advantageous as it is sometimes desirable to vary the spacing between electrode 143 and electrode 150. With the construction shown, such variation in the spacing may be made by substituting a lower end section of different length.

In Fig. 8 the cable 117 is shown covered with a basket weave armor but it is not essential that any armor be employed if the arrangement is used in a circuit such as that shown in Fig. 1. However if it is desired to employ the structure of Figs. 8 and 9 with a 3-conductor cable such as illustrated in Fig. 4, then one of the conductors would be connected to the armor of the cable where the latter enters the electrode structure.

A specific way in which the structure shown in Figs. 7, 8 and 9 may be modified for use with a 4-conductor cable having individually armored conductors, is illustrated in Fig. 10. Parts of this structure correspond to parts shown in Fig. 8 and bear the same reference numerals with the suffix $d$.

It will be observed that in Fig. 10 the individually armored conductors 116$d$ pass through a block 121$d$ and through passages in a block 155, the passages tapereing from a small diameter at the top to a large diameter at the bottom. The armor is spread away from the insulated member therebelow so that it lies out against the surface of the conical passage and a hollow conical block 156 is positioned above the insulated conductor inside of the armor wires so as to wedge the latter against the walls of the recess and thereby mechanically anchor the cable armor to the block 155. It should be observed that in the type of cable disclosed in Fig. 10 and also in Fig. 3, the armor wires constitute the tensile supporting elements of the cable so that the electrical conductors do not take the strain.

The insulated electrical conductors within the armor extend down through the central openings in the wedge members 156 and through registering openings in a block of insulating material 157 therebelow. At the lower end of the block 157 the openings are enlarged and receive metal sockets 158 to which the electrical conductors are soldered or otherwise secured. These sockets 158 are adapted to be engaged by plug ends 159 of metal conducting elements 109d and 110d positioned in a block of Bakelite, or other insulating material 105d, which corresponds in function to the members 109, 110 and 105 in Fig. 8.

Of course in the construction shown in Fig. 10, there are as many wedge elements 156 as there are separate armored conductors in the cable. However, when the structure is employed in a system of the type shown in Fig. 2, only two of the cable conductors are electrically connected to the electrode structure and these may be connected to two electrodes as described in connection with Figs. 8 and 9. The remaining two conductors are electrically connected to the cable armor and to this end this connection may be made in any convenient manner. An obvious way to make the connection is to remove the insulation from the central conductors at the upper ends of the plugs 156 and extend the conductor wires out alongside the armor wires and clamp them with the armor wires between the plug members 156 and the walls of the sockets in the block 155. That portion of the armor structure which contacts the well fluid may be spaced a desired distance above the electrodes on the lower end of the electrode structure described by extending the hose 127d and/or the outer rubber ferrule 147d the desired distance up along the exterior of the cable.

Although certain specific embodiments of the invention have been described in detail for the purpose of clearly illustrating and explaining the invention, it is to be understood that many variations from the specific constructions and arrangements described can be made without departing from the invention, and the latter is to be limited only to the extent set forth in the appended claims.

I claim:

1. Apparatus for electrical earth exploration in drill holes comprising two spaced apart electrodes adapted to be positioned in a drill hole, a cable comprising a pair of insulated conductors connected at their lower ends to said respective electrodes, means for winding up said cable to raise said electrodes in a drill hole, and unwinding the cable to lower the electrodes, means for producing a flow of alternating current through one conductor, the electrode connected thereto, and into the formation surrounding that electrode, means connected to said other electrode at the surface for indicating changes in the potential of the upper end of said other conductor, and means connected in circuit with said indicating means for adding a potential to said indicated potentials to compensate for the effects on said indicating means resulting from changes in the electrical characteristics of said cable produced by winding and unwinding said cable.

2. Apparatus for exploring the formation traversed by a drill hole containing conducting fluid, comprising a cable containing a pair of insulated conductors terminating in a pair of spaced apart electrodes, means for moving said cable through the drill hole, means for producing a current through one of said conductors and from the electrode connected thereto into the surrounding formation, means connected to the other electrode through the conductor connected thereto for measuring potential variations in the other electrode as the cable is moved through the drill hole, and means for superimposing on the potential applied from said other electrode to said measuring means, a substantially constant potential to increase the potential supplied to said measuring means to a predetermined average level higher than the average level of the potential variations of said other electrode.

3. Apparatus for exploring the formation traversed by a drill hole containing conducting fluid, comprising a cable containing a pair of insulated conductors terminating in a pair of spaced apart electrodes, means for moving said cable through the drill hole, means for producing an alternating current through one of said conductors and from the electrode connected thereto into the surrounding formation, means connected to the other electrode through the conductor connected thereto for measuring potential variations in the other electrode as the cable is moved through the drill hole, means for superimposing on the potential applied from said other electrode to said measuring means a substantially constant alternating potential of the same frequency as said source but of reduced average value to increase the potential supplied to said measuring means to a predetermined average level higher than the average level of the potential variations of said other electrode.

4. Apparatus for exploring the formation traversed by a drill hole containing conducting fluid, comprising a cable containing a pair of insulated conductors terminating in a pair of spaced apart electrodes, means for moving said cable through the drill hole, means for producing an alternating current through one of said conductors and from the electrode connected thereto into the surrounding formation, means connected to the other electrode through the conductor connected thereto for measuring potential variations in the other electrode as the cable is moved through the drill hole, and means for deriving from said source a potential of the same frequency but of reduced average value and superimposing it upon the potential applied from said other electrode to said measuring means, whereby the potential applied from said other electrode to said measuring means is increased to a predetermined average level.

5. Apparatus for exploring the formation traversed by a drill hole containing conducting fluid comprising a cable containing a pair of insulated conductors terminating in a pair of spaced apart electrodes, means for moving said cable through the drill hole, means for producing a flow of alternating current through one of said conductors and from the electrode connected thereto into the surrounding formation, means connected to the other electrode through the conductor connected thereto for measuring potential variations in the other electrode as said cable is moved through the drill hole, said measuring means comprising a rectifier having an input circuit connected to said other electrode and having an output circuit, a direct current indicating instrument connected to the output circuit of said rectifier, and a source of direct current of adjustable resistance connected in shunt to the output circuit of said rectifier and instrument.

6. Apparatus for exploring the formation traversed by a drill hole containing conductive fluid comprising a cable having four insulated conductors adapted to be lowered into the drill hole from the surface, means at the surface for coiling and uncoiling said cable to raise and lower the lower end of the cable in the hole, a source of alternating potential, and means for applying potential therefrom between the upper ends of a first pair of said insulated conductors, a long electrode exposed to the conducting fluid in said drill hole and connected to the lower end of one of the conductors of said first pair, a short electrode vertically spaced from said long electrode and connected to the lower end of the other conductor of said first pair, means for indicating potential variations connected between the upper ends of a second pair of said insulated conductors, a long electrode connected to the lower end of one conductor of said second pair, and a short electrode vertically spaced from all the previously mentioned electrodes connected to the lower end of the other conductor of said second pair.

7. Apparatus as described in claim 6, in which said cable comprises conducting means insulated from but individually shielding each of said conductors from the other conductors of the cable.

8. Apparatus as described in claim 6, including means for indicating impedance variations in the circuit including said first pair of said conductors and the electrodes connected thereto.

9. Apparatus as described in claim 6, in which the vertical spacing between the two short electrodes is substantially less than the vertical spacing between either of the short electrodes and one of said long electrodes.

10. Apparatus for exploring the formation traversed by a drill hole containing conductive fluid comprising a cable having four insulated conductors adapted to be lowered into the drill hole from the surface, means at the surface for coiling and uncoiling said cable to raise and lower the lower end of the cable in the hole, a source of alternating potential, and means for applying potential therefrom between the upper ends of a first pair of said insulated conductors, a long electrode exposed to the conducting fluid in said drill hole and connected to the lower end of one of the conductors of said first pair, a short electrode vertically spaced from said long electrode and connected to the lower end of the other conductor of said first pair, means for indicating potential variations connected between the upper ends of a second pair of insulated conductors, one conductor of said second pair being connected at its lower end to said long electrode, and a short electrode vertically spaced from all previously mentioned electrodes connected to the lower end of the other conductor of said second pair.

11. Apparatus as described in claim 6, in which the cable is provided with metallic armor exposed to conducting fluid in the drill hole and said armor constitutes one at least of said long electrodes.

12. Apparatus for exploring the formation traversed by a drill hole containing conductive fluid, including a cable comprising two insulated conductors, and an exterior conductive armor, means at the surface for coiling and uncoiling the cable to raise and lower the end of the cable in the hole, a source of potential and means for applying potential therefrom between the upper ends of said insulated conductors, the lower end of one of the conductors being connected to said armor at the lower end of said cable, a short electrode connected to the lower end of the other conductor, and electrical measuring means connected to the upper ends of said conductors, in which said armor extends substantially to the said electrode on the lower end of said cable, and means for insulating said armor from fluid in said drill hole for a predetermined distance extending upwardly from the said electrode.

13. Apparatus for exploring the formation traversed by a drill hole containing conductive fluid comprising a cable having three insulated conductors adapted to be lowered into the drill hole from the surface, two electrodes on said cable connected to the lower ends of two of said conductors, a return circuit to ground for each electrode, the ground return path for one at least of said two circuits comprising the third conductor in said cable, and a third electrode connected to the lower end of said third conductor, said third electrode being in spaced relation to said first two electrodes, and said third electrode having contact surface exposed to the fluid in the drill hole over a substantially greater length than said first and second electrodes.

14. In apparatus for determining varying alternating current characteristics of earth formations penetrated by a drill hole containing conductive fluid, in which a cable having electrically insulated conductors connected at their lower ends to electrodes, and connected at their upper ends to measuring apparatus, is coiled and uncoiled to vary the positions of the electrode, the cable construction comprising, in addition to said electrically insulated conductors, other conducting means insulated from and individually enclosing each of said conductors, whereby variations in the impedance of said conductors and variations in the coupling between said conductors resulting from coiling and uncoiling from said cable, are reduced.

15. In apparatus for making electrical measurements in bore holes containing conductive fluid, a cable having a tensile supporting element, an insulated electrical conductor element, and a terminal electrode structure comprising an upper frame member and a lower frame member, and means for detachably fastening them together, said members having abutting and sealing cooperating end faces, means for anchoring said tensile supporting element of said cable in said upper frame member, a slip connector in said upper frame member, and means for conducting said electrical conductor element of said cable thereto, a slip connector in said lower frame member adapted to connect with the slip connector in the upper frame member in response to joinder of said two frame members, and an exposed electrode element on said lower frame member electrically connected to the slip connector on the lower frame member.

16. Apparatus as described in claim 15, in which the means for anchoring said tensile element of the cable comprises a socket member having an inner surface and cooperating plug members having a conical outer surface, and means for clamping said socket member and plug member together to grip said tensile member of the cable therebetween.

17. Apparatus as described in claim 15, in which the cable comprises an insulated conductor surrounded with a layer of armor wires constituting the tensile element, and said means for anchoring said tensile element comprises a socket member having a conical inner surface and a cooperating plug member having a conical outer surface, and means for clamping said socket member and plug member together to grip said armor wires therebetween, said socket and plug members having central openings extending therethrough for passing said insulated conductor.

18. An electrode structure adapted to be suspended on a cable containing an insulated conductor for taking electrical measurements in drill holes, comprising a rigid frame member, means for anchoring it to a cable, a layer of resilient insulated material extending circumferentially around said frame member and longitudinally therealong for a substantial distance and an electrode element comprising a metallic insert imbedded in said resilient material with its outer surface exposed, and means for connecting said electrode element to the insulated element of the cable.

19. Apparatus as described in claim 18, including connector means on said frame and insulated therefrom adjacent one end of said structure adapted to be connected to a cable conductor, said connector means being spaced longitudinally from said metallic insert, and means electrically connecting said insert to said connector means comprising a thin strip of metal completely imbedded in said insulating material.

20. In electrical exploration of well holes containing conductive fluid, an electrode for electrically contacting fluid at two longitudinally spaced surfaces of limited effective length, one of which electrodes has relatively low total surface resistance with the fluid, comprising an inner hollow conductive member of substantial length sealed at one end and open at the other end to well fluid, said member constituting one of said electrodes, a sheath of insulating material surrounding said surface exterior of said hollow member at all points except closely adjacent the open end thereof, and a second electrode rigidly supported on said insulating sheath in spaced position from said open end of said member.

21. In apparatus for making electrical measurements in bore holes comprising a cable containing a plurality of insulated conductors, electrode means on the lower end of the cable and connected to said conductors, electrical measuring means connected through said insulated conductors to said electrodes, and means for coiling and uncoiling the cable at the surface to raise and lower the electrodes in the hole; the cable construction comprising: a plurality of separate strand members twisted together, each strand member comprising a central conductor surrounded with flexible insulating material and a layer of armor wires surrounding and enclosing said insulating material.

22. Apparatus for electrical exploration in drill holes comprising a cable having at least two conductors, means for coiling and uncoiling said cable to move it in a bore hole, means including one of said conductors for passing current through the formation surrounding the bore hole, a variable impedance element in the circuit of said conductor for compensating for the changing conductor impedance resulting from coiling and uncoiling said conductor and means including a second conductor for obtaining indications of potentials produced in the bore hole by current passing through the formations.

23. Apparatus for electrical exploration in drill holes comprising a cable having at least two conductors, means for coiling and uncoiling said cable to move it in a bore hole, means including one of said conductors for passing current through the formation surrounding the bore hole, a variable impedance element in the circuit of said conductor, means for controlling said impedance element to vary its impedance in a manner complementary to the variations in conductor impedance resulting from coiling and uncoiling said conductor and means including a second conductor for obtaining indications of potentials produced in the bore hole by current passing through the formations.

24. Apparatus for electrical exploration in drill holes comprising a cable having at least two conductors, means for coiling and uncoiling said cable to move it in a bore hole, means including one of said conductors for passing current through the formation surrounding the bore hole, a variable impedance element in the circuit of said conductor, means responsive to movement of said cable for controlling said impedance element to vary its impedance in a manner complementary to the variations in conductor impedance resulting from coiling and uncoiling said conductor and means including a second conductor for obtaining indications of potentials produced in the bore hole by current passing through the formations.

25. Apparatus for electrical exploration in drill holes comprising a cable having at least two conductors, means for coiling and uncoiling said cable to move it in a drill hole, means including one of said conductors for establishing an alternating electric field in the formation surrounding the drill hole, means including a second conductor for measuring the potentials in the drill hole resulting from the said electric field, and means for adding a variable potential to said measured potentials to compensate for variations in potentials induced in said second conductor by said first conductor, resulting from coiling and uncoiling said cable.

26. Apparatus for electrical exploration in drill holes comprising a cable having at least two conductors, means for coiling and uncoiling said cable to move it in a drill hole, means including one of said conductors for establishing an alternating electric field in the formation surrounding the drill hole, means including a second conductor for measuring the potentials in the drill hole resulting from the said electric field, means for adding a variable potential to said measured potentials, and means for controlling said potential adding means to vary the potential added to the measuring circuit to compensate for variations in potentials induced in said second conductor by said first conductor, resulting from coiling and uncoiling said cable.

27. Apparatus for electrical exploration in drill holes comprising a cable having at least two conductors, means for coiling and uncoiling said cable to move it in a drill hole, means including one of said conductors for establishing an alternating electric field in the formation surrounding the drill hole, means including a second conductor for measuring the potentials in the drill hole resulting from the said electric field, means for adding a variable potential to said measured potentials, and means responsive to movement of said cable for controlling said potential adding means to vary the potential added to the measuring circuit to compensate for the effects of variations in potentials induced in said second conductor by said first conductor resulting from coiling and uncoiling said cable.

28. Apparatus for electrical exploration in drill holes comprising a cable having at least two conductors, means for coiling and uncoiling said cable to move it in a drill hole, means including one of said conductors for establishing an alternating current field in the formation surrounding a drill hole, a variable impedance element in the circuit of said conductor for compensating for the changing conductor impedance resulting from coiling and uncoiling said conductor, means including a second conductor for measuring the potentials in the drill hole resulting from said electric field, and means for adding a potential to said measured potentials to compensate for variable potentials induced in said second conductor by said first conductor, resulting from coiling and uncoiling said cable.

29. Apparatus for electrical exploration in drill holes, comprising a cable having at least two conductors, means for coiling and uncoiling said cable to move it in a drill hole, means including one of said conductors for establishing an alternating current field in the formation surrounding the drill hole, a variable impedance element in the circuit of said conductor for compensating for the changing conductor impedance thereof resulting from coiling and uncoiling said cable, means including a second conductor for measuring potentials in the drill hole resulting from said electric field, means for adding a potential to said measured potentials to compensate for variable potentials induced in said second conductor by said first conductor, resulting from coiling and uncoiling said cable, and means responsive to winding and unwinding movement of said cable for actuating both said variable impedance element and said potential adding means.

RAYMOND D. ELLIOTT.